United States Patent
Chen et al.

(10) Patent No.: US 11,628,634 B2
(45) Date of Patent: Apr. 18, 2023

(54) METHOD FOR MANUFACTURING A FIBER REINFORCED POLYMER COMPOSITE BEAM, PARTICULARLY A SPAR BEAM FOR A WIND TURBINE ROTOR BLADE

(71) Applicant: General Electric Company, Schenectady, NY (US)

(72) Inventors: Xu Chen, Simpsonville, SC (US); Amir Riahi, Simpsonville, SC (US); Thomas Merzhaeuser, Munich (DE); Julie Ann Shepherd, Liberty, SC (US); Louis Rondeau, Greenville, SC (US); Scott Iverson Shillig, Greenville, SC (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 17/312,975

(22) PCT Filed: Dec. 11, 2018

(86) PCT No.: PCT/US2018/064832
§ 371 (c)(1),
(2) Date: Jun. 11, 2021

(87) PCT Pub. No.: WO2020/122863
PCT Pub. Date: Jun. 18, 2020

(65) Prior Publication Data
US 2022/0048258 A1    Feb. 17, 2022

(51) Int. Cl.
B29C 70/34    (2006.01)
B29C 70/54    (2006.01)
(Continued)

(52) U.S. Cl.
CPC .......... *B29C 70/342* (2013.01); *B29C 33/485* (2013.01); *B29C 70/546* (2013.01); *B29L 2031/085* (2013.01)

(58) Field of Classification Search
None
See application file for complete search history.

(56) References Cited

U.S. PATENT DOCUMENTS 5,213,476 A    5/1993  Monroe
5,258,159 A    11/1993 Freeman et al.
(Continued)

FOREIGN PATENT DOCUMENTS

EP    1310351 A1    5/2003
EP    1779997 A2    5/2007
(Continued)

OTHER PUBLICATIONS

PCT International Search Report & Opinion Corresponding to PCT/US2018/064832 dated Aug. 14, 2019.
(Continued)

*Primary Examiner* — Barbara J Musser
(74) *Attorney, Agent, or Firm* — Dority & Manning, P.A.

(57) ABSTRACT

A method for producing a hollow composite structure, such as a spar beam for a wind turbine blade, includes placing a membrane within a mold tool, the membrane being permeable to air and impermeable to resin. A mandrel is placed within the mold tool, the mandrel enclosed in an air tight layer that includes a vent. Fiber reinforcement material is placed around the mandrel within the mold tool and the membrane is sealed at least partly around the fiber reinforcement material and mandrel. The mold tool is closed with the vent line from the mandrel extending through the sealed membrane to outside of the mold tool. A vacuum is drawn in the mold tool while the mandrel is vented to (Continued)

outside of the mold tool, and while the vacuum is being drawn, resin is infused into the mold tool around the mandrel such that the resin is drawn towards the membrane.

15 Claims, 5 Drawing Sheets

(51) Int. Cl.
    *B29C 33/48* (2006.01)
    *B29L 31/08* (2006.01)

(56) References Cited

U.S. PATENT DOCUMENTS

| | | | |
|---|---|---|---|
| 6,843,953 B2 | 1/2005 | Filsinger et al. | |
| 2007/0175577 A1 | 8/2007 | Dagher et al. | |
| 2008/0136060 A1 | 6/2008 | Shpik et al. | |
| 2011/0049770 A1 | 3/2011 | Stiesdal | |
| 2011/0272852 A1 | 11/2011 | Blot et al. | |
| 2012/0119405 A1 | 5/2012 | Weber et al. | |
| 2015/0369211 A1 | 12/2015 | Merzhaeuser | |
| 2016/0214329 A1 | 7/2016 | Fernandes et al. | |

FOREIGN PATENT DOCUMENTS

| | | |
|---|---|---|
| EP | 3103626 A1 | 12/2016 |
| GB | 903734 A | 8/1962 |
| JP | 2010023317 | 2/2010 |
| WO | WO2014/115668 A1 | 7/2014 |

OTHER PUBLICATIONS

The foreign Office Action with translation for CN application No. 201880100688.7, 9 pages.
The foreign Office Action with translation for JP application No. 2021-532200, 5 pages.

METHOD FOR MANUFACTURING A FIBER REINFORCED POLYMER COMPOSITE BEAM, PARTICULARLY A SPAR BEAM FOR A WIND TURBINE ROTOR BLADE

FIELD

The present subject matter relates generally to the manufacture of hollow composite structures, and more particularly to an improved method for manufacturing a spar beam for use in a wind turbine rotor blade.

BACKGROUND

Hollow, fiber-reinforced polymer composite structures are desired for their structural properties, particularly for use in large wind turbine rotor blades. In recent years, wind turbines for wind power generation have increased in size to achieve improvement in power generation efficiency, as well as the amount of power generation. Along with the increase in size of wind turbines, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a spar beam structure that extends span-wise from one blade segment into a receiving section of the other blade segment. Reference is made, for example, to US Patent Publication No. 2015/0369211, which describes a first blade segment with a spar beam structure extending lengthways that structurally connects with a second blade segment at a receiving section. The spar beam structure forms a portion of the internal support structure for the blade and is a box-beam structure with a suction side spar cap and a pressure side spar cap. Multiple bolt joints are on the beam structure for connecting with the receiving end of the second blade segment, as well as multiple bolt joints located at the chord-wise joint between the blade segments.

For structural and weight considerations, it is desired that the spar beam structure is a hollow, fiber-reinforced polymer composite consisting of multiple types of materials, such as glass fabric, pultrusion, foam core and composite prefabs. A conventional process of making such a complex structure is to produce multiple prefabricated components and then use structural adhesive to join those components together. Such manufacturing process, however, not only poses risks of compromising the structural integrity of the spar beam, but is also cost and labor intensive.

U.S. Pat. No. 6,843,953 provides a method for producing fiber-reinforced plastic components made of dry fiber composite preforms by an injection method for injecting matrix material. The fiber composite preform is arranged on a tool, and a first space is created by a gas-permeable and matrix-material-impermeable membrane arranged on at least one side of the preform, wherein matrix material is feed into the first space. A second space is arranged between the first space and the surroundings by a foil, which is impermeable to gaseous material and matrix material. Air is removed by suction from the second space, wherein matrix material is sucked from a reservoir into the evacuated first space. A flow promoting device causes distribution of the matrix material above the surface of the preform facing the flow promoting device, thus causing the matrix material to penetrate the preform vertically.

The present invention is drawn to an improved method for producing a hollow fiber-reinforced composite structure, such as the spar beam structure discussed above for a wind turbine blade, wherein all of the dry materials that are laid up in a forming tool of defined geometry are uniformly wet out and joined by infused resin with minimal void spaces in the structure.

BRIEF DESCRIPTION

Aspects and advantages of the invention will be set forth in part in the following description, or may be obvious from the description, or may be learned through practice of the invention.

In one aspect, the present disclosure is directed to a method for producing a hollow composite structure, such as a structural component in a wind turbine blade. The method includes placing a membrane within a mold tool, wherein the membrane is formed from a material that is permeable to air and impermeable to resin. A mandrel is placed within the mold tool, and the mandrel is enclosed in an air tight layer that includes a vent. Fiber reinforcement material is laid around the mandrel within the mold tool. The fiber reinforcement material may include any one or combination of known materials commonly used in the construction of high strength, light weight structural components, including glass fiber materials, carbon fiber materials, pultrusion rods or plates, and so forth. Such materials are particularly well known in the construction of wind turbine blades.

The method includes sealing the membrane at least partly around the fiber reinforcement material and mandrel and closing the mold tool while the vent line from the mandrel extends through the sealed membrane to outside of the mold tool. A vacuum is then drawn in the mold tool while the mandrel is vented to outside of the mold tool. While the vacuum is being drawn, resin is infused into the mold tool around the mandrel such that the resin is injected/drawn against the membrane. The resin may be infused into the mold tool at one or more locations between the membrane and the mandrel. After the resin is cured, the combination of mandrel and materials is removed from the mold. The mandrel is then removed, thereby leaving the hollow composite component.

With this arrangement, since the airtight layer seals to itself around the mandrel, when air is removed from the space that is occupied by the dry fiber reinforcement materials ("dry layup materials") for resin infusion, atmospheric air is drawn into the space between the mandrel and the airtight layer causing this space to expand and displace the resin into the dry layup materials where it is most critical.

The vacuum may be drawn in the mold tool through one or more ports at a side of the membrane opposite to the resin infusion site such that the resin is drawn by the vacuum through the fiber reinforcement material surrounding the mandrel to the membrane.

In a particular embodiment, the method may include placing a peel layer, such as a perforated film layer, between the fiber reinforcement material and the membrane.

In still another embodiment, the method may include placing a breather layer between the membrane and the mold tool.

In certain embodiments, the membrane may completely enclose the fiber reinforcement material and the mandrel. In other embodiments, the membrane may be placed only at discrete locations around the laminate, for example at known void areas. In this regard, the method may include predicting a resin flow pattern within the mold tool and identifying one or more voids where the resin is "last-to-fill" within the mold tool. The can then be placed within the mold at locations corresponding to the last-to-fill voids without completely enclosing the fiber reinforcement material and the mandrel within the membrane.

In addition, the method may include drawing the vacuum through one or more ports in the mold tool at locations corresponding to the last-to-fill voids.

The mold tool may be configured as a female mold tool or as a male mold tool. It should be understood that the invention is not limited by the type or configuration of the mold tool.

The invention is not limited by the type or configuration of the composite structure formed by the method. In a particular embodiment, the composite structure is a box-beam structure wherein, subsequent to curing of the resin, the mandrel is withdrawn through an opening at an end of the box-beam structure. The box-beam structure may be a spar structure for a wind turbine rotor blade, particularly a spar structure used to connect blade components in a jointed wind turbine blade. In this regard, the mandrel may be formed of a compressible material, such as a foam material, wherein the method includes drawing a vacuum on the mandrel to compress the mandrel prior to withdrawing the mandrel through the opening in the box-beam structure. The vacuum may be drawn through the vent in the air tight layer that surrounds the mandrel, or through a different vacuum port in the air tight layer. This embodiment is particularly beneficial if the box-beam structure is tapered with a larger closed end and a smaller open end through which the compressed mandrel can be withdrawn.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
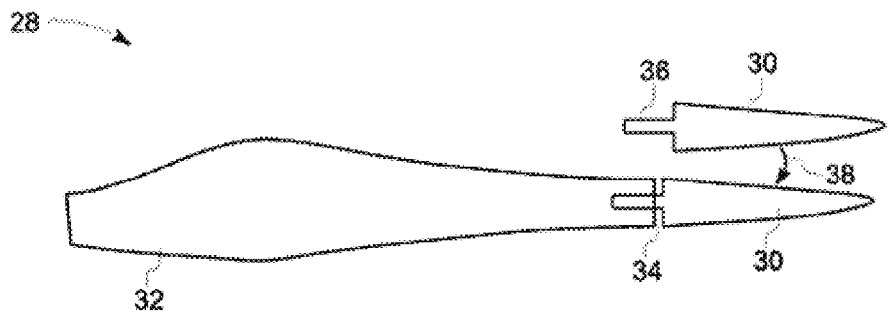
FIG. 1 illustrates a jointed wind turbine rotor blade having a first blade segment and a second blade segment; in accordance with the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a method for producing a hollow composite structure wherein the mandrel used as a former in the mold cannot be removed through the opening in the composite structure. It should be appreciated that the method is not limited to the particular type or intended use of the composite structure. The method does, however, have particular usefulness in the manufacture of tapered composite beam structures used in the production of wind turbine blades and, in this regard, exemplary non-limiting embodiments of the present method and associated mandrel are explained herein with reference to a spar beam structure used in production of jointed wind turbine blades.

Figure 2:
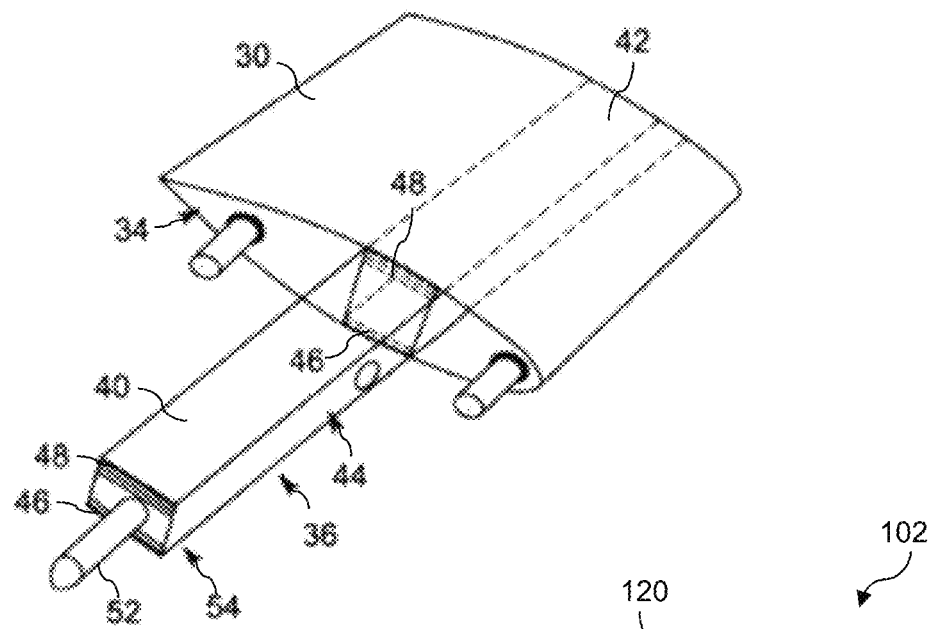
FIG. 2 is a perspective view of an embodiment of a first blade segment having a spar beam component.

Referring to FIGS. 1 and 2, a jointed rotor blade 28 is depicted having a first blade segment 30 and a second blade segment 32 extending in opposite directions a chord-wise joint 34. The first blade segment 30 and the second blade segment 32 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 20, 32 are joined by inserting the internal support structure 36 of blade segment 30 into the second blade segment 32.

Referring particularly to FIG. 2, the first blade segment 30 includes a spar beam structure 40 that forms a portion of the internal support structure 36 and extends lengthways (e.g., span-wise) for structurally connecting with the second blade segment 32. The spar beam structure 40 may be integrally formed with the first blade segment 30 as an extension protruding from a spar section 42, thereby forming an extending spar section. The spar beam structure 40 is a box-beam composite structure having opposite shear webs 44 connected with a suction side spar cap 46 and a pressure side spar cap 48. An end structure 54 is connected to the spar beam structure 44 and includes a bolt tube 52.

Although not depicted in the figures, the second blade segment includes a receiving section at the joint line 34, wherein the spar beam structure 44 slides into the receiving section to join the blade segments 30, 32. The bolt tube 52 fits into a receiving slot in an end face of the receiving section.

As mentioned, the present method may be particularly useful for manufacturing the spar beam structure 44, although this is not a limiting embodiment of the method.

Figure 3:
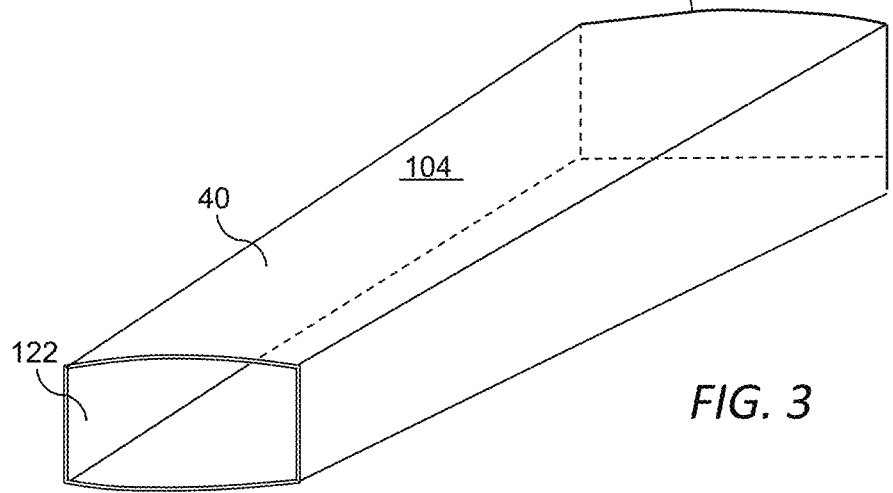
FIG. 3 is a perspective view of a hollow composite structure that can be produced in accordance with method embodiments of the present invention.

The spar beam structure 44 is manufactured as a fiber reinforced composite structure in a fiber material lay up and curing process. The spar beam structure 44 may have a tapered profile that tapers from a larger (cross-sectional area) closed end 120 (FIG. 3) to an open, smaller end 122. With this configuration, a conventional rigid mandrel may not be suitable in the manufacturing process because such a mandrel cannot readily be removed through the small end 122 of the spar beam structure 44, as discussed in greater detail below.

The present disclosure provides a method for producing a hollow composite structure 102 (FIG. 3), such as a hollow fiber-reinforced component similar to the spar beam structure 44 discussed above. An embodiment of the method 100 is depicted in FIGS. 4a through 4f.

Figure 4A:
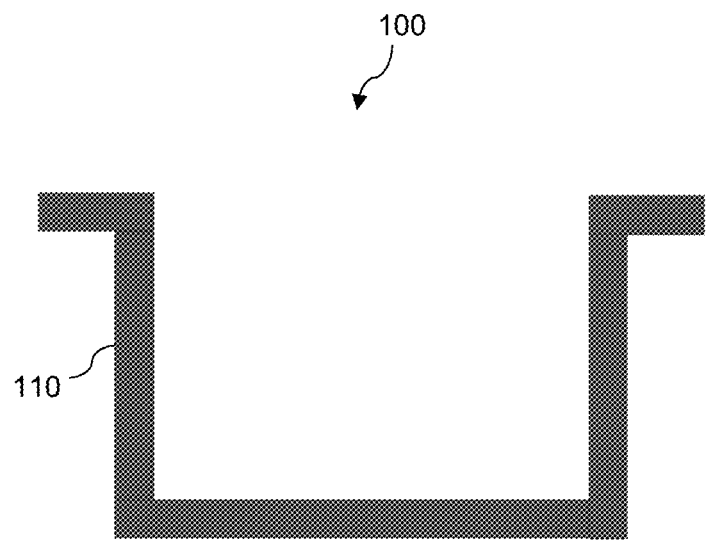
FIGS. 4a through 4f depict sequential method steps in accordance with an embodiment of the invention.

FIG. 4a depicts a first mold tool (female) 110 used in a conventional fiber lay up and curing process. The outer surface of the structural component 102 is defined by the inner surface of the mold tool 110.

Figure 4B:
Figure 4B:
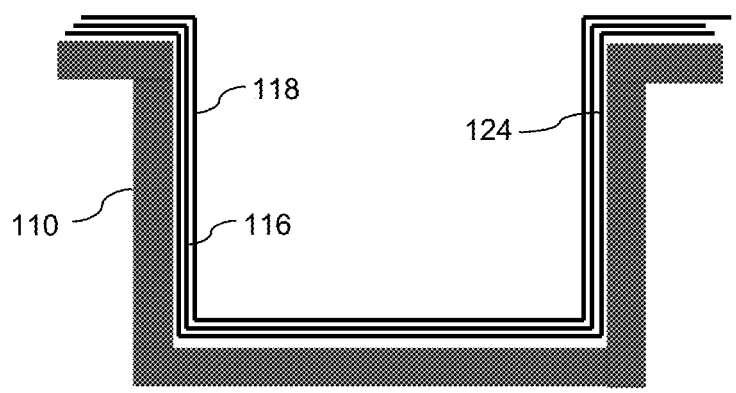

In FIG. 4b, a membrane material 116 is placed in the mold tool 110. This material 116 is selected to be permeable to air, but impermeable to resin flow. An example of this membrane material 116 is VAP® (Vacuum Assisted Process) membrane. Those skilled in the art will appreciate that other materials with these properties may be available, and that the invention is not limited to any particular material as the membrane 116.

FIG. 4b also depicts a breather (or "spacer") layer 124 placed in the mold tool 110 between the membrane 116 and the mold tool 110. This breather layer 124 is air permeable and serves to maintain the membrane 116 spaced from the inner surface of the mold tool 110 when vacuum is drawn in the mold tool 110. An example of this breather layer is Airtech Econoweave breather material. Those skilled in the art will appreciate that other materials with these properties may be available, and that the invention is not limited to any particular material as the breather layer 124.

FIG. 4b also depicts a peel layer 118 placed in the mold tool 110 adjacent the membrane 116. The use of a peel layer 118 in a fiber material lay up and resin curing process is well known in the art. In general, the peel layer 118 is a porous material that is not readily adhered to by the resin, such as a perforated nylon film or nylon fabric. With use of this peel layer 118, the excess resin that flows outward beyond the fiber reinforcement materials is easily "peeled" away from the composite structure 102 upon removal of the composite structure from the mold tool 110.

Figure 4C:
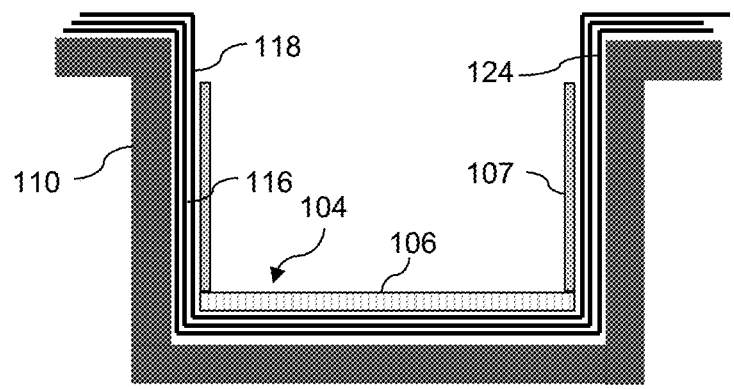

FIG. 4c depicts placement of fiber reinforcement material 104 in the mold tool 110 adjacent the peel layer 118. Suitable fiber reinforcement materials 104 are well known to those skilled in the art, and may include any combination of glass plies, mineral fibers and polymer fibers, including glass fibers, metallic fibers, or carbon fibers. The fiber reinforcement material 104 may include polymer fiber, such as aromatic polyamides, polyethylene, polyurethane or aramide fibers. The fiber material 104 may comprise different types of fiber materials and may form a composite material. The fiber material 104 may in in the form of unidirectional or multidirectional fibers, prepregs, fiber boards, or fiber mats. In the embodiment depicted in the figures, the fiber reinforcement materials 104 include carbon pultrusion rods 106 at locations corresponding to the spar caps 46, 48 of the spar beam structure 40 discussed above. The pultrusion rods 106 add to the structural integrity of the spar cap sections of the final composite structure 102 (particularly, the spar beam structure 44).

FIG. 4c also depicts placement of fiber mats or boards 107 in the mold 110 that will serve to add structural rigidity to the shear web components 44 of the spar beam structure 44.

Figure 4D:
Figure 4D:
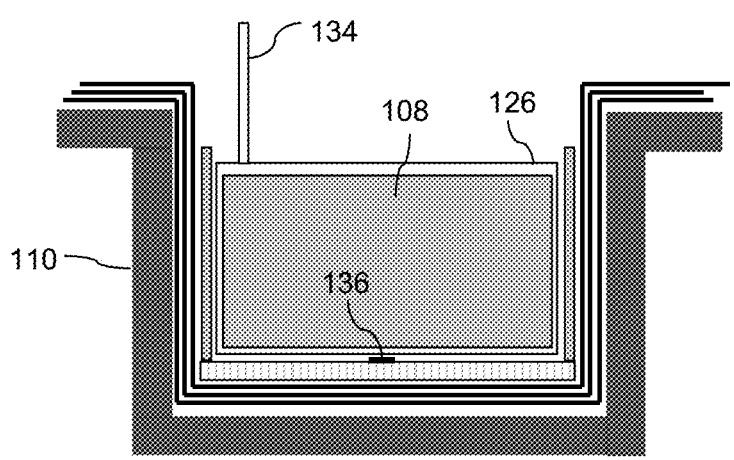

FIG. 4d depicts placement of the mandrel 108 in the mold 110. The mandrel 108 may be a rigid structure or may be formed from a compressible material 114 having a rigid neutral state (uncompressed state) with a defined shape corresponding to the desired shape of the composite structure 102 and a rigidity in the neutral state to maintain the defined shape during lay up and curing of the fiber reinforcement materials 104, 106, 107. The mandrel 108 is enclosed by an air tight layer 126. A vent line 134 is configured with the air tight layer 126 to vent the mandrel space during the resin infusion process. It should be appreciated that the present method also includes use and placement of multiple mandrels 108 in the mold 110, depending on the design of the beam structure. For example, if the beam structure has individual hollow spaces separated by a web, then separate mandrels 108 are used to define the respective hollow spaces.

FIG. 4d also depicts a resin infusion/injection site 136 into the mold tool 110 between the air tight layer 126 and the fiber reinforcement materials 104. It should be appreciated that multiple infusion sites 136 maybe configured around the mandrel 108 and longitudinally along the mold tool 110.

Figure 4E:
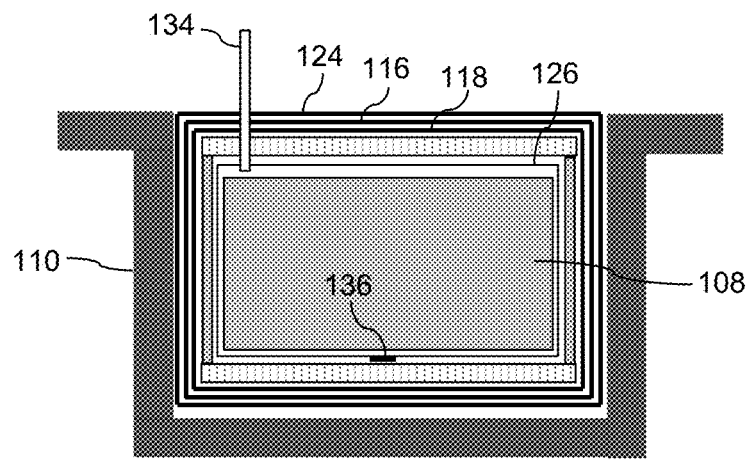

FIG. 4e depicts placement of additional fiber reinforcement materials 104 over the mandrel 108, such as additional carbon pultrusions 106 and/or glass fiber plies. The additional pultrusions 106 will provide structural rigidity and strength to the opposite spar cap of the spar beam structure 40. The vent line 134 extends through or between the fiber reinforcement materials 104 placed on top of the mandrel 108.

FIG. 4e also depicts the peel layer 118, the membrane 116, and the breather layer 124 folded and sealed over the top of the additional fiber reinforcement materials 104. The vent line 134 also extends through the layers 118, 116, and 124.

Figure 4F:
Figure 4F:
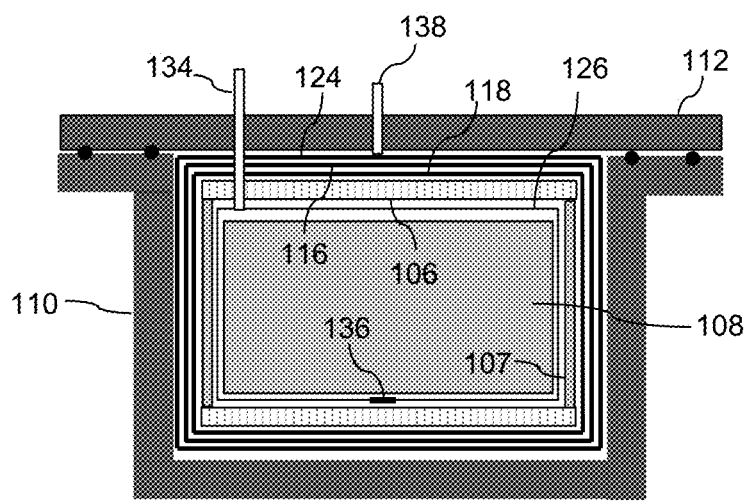

In FIG. 4f, the second mold tool 112 (mold cap) is installed over the fiber/mandrel layup. The vent line 134 also extends through a port in the mold tool 112. A vacuum port 138 is configured in the mold tool 112. It is appreciated that multiple vacuum ports 138 may be provided for drawing a vacuum in the mold 110/112 during the resin infusion process.

The resin infusion and curing process is conducted with the configuration of FIG. 4f, wherein resin is injected through the one or more resin injections sites 136 as a vacuum is drawn in the mold 110/112 through the one or more vacuum ports 138. While the vacuum is drawn around the mandrel 108, the air in and around the fiber reinforcement materials 104 is evacuated through the membrane 116 as the resin is drawn/injected against the membrane 116. The mandrel space enclosed by the air tight layer 126 is vented via vent line 134. As pre-existing air is evacuated from the space occupied by the dry layup materials, atmospheric air is pulled in through the vent line 134 into the space between the air tight layer and the mandrel and therefore inflates the air tight layer 126. Since the dry layup materials get consolidated under the vacuum (and their thickness decreases within a certain period of time), the space between the air the air tight layer 126 and the mandrel expands accordingly.

After the resin has cured, the mold tool 112 is removed and the composite structure 102 is removed from the mold tool 110. The mandrel 108 is removed through an open end of the composite structure 102. The vent line 134 is removed. The peel layer 118, membrane 116, and breather layer 124 are removed from around the composite structure 102. Any number of finishing processes may be performed on the composite structure 102 at this point.

In certain embodiments, the membrane 116 may completely enclose the fiber reinforcement material 104 and the mandrel 108, as in the depicted embodiment. In other embodiments, the membrane 116 may be placed only at discrete locations around the mandrel 108, for example at known void areas where the resin does not completely infuse. In this regard, the method may include predicting a resin flow pattern within the mold tool 110/112 and identifying one or more voids where the resin is "last-to-fill"

within the mold tool 110/112 (which encompasses voids that may not fill at all). The membrane 116 can then be placed within the mold 110 at locations corresponding to the last-to-fill voids without completely enclosing the fiber reinforcement material 104 and the mandrel 108 within the membrane 116. This configuration may be beneficial from a cost standpoint in that in minimizes use of the membrane 116 to only areas where it is most needed.

In addition, the method may include locating the vacuum ports 138 in the mold tool 110/112 at the locations corresponding to the last-to-fill voids so that the vacuum is drawn directly at the void locations to further draw the resin into the voids.

As mentioned, although the initial mold tool 110 is depicted in the figures as a female tool, it should be appreciated that the method 100 may just as readily be performed with a male tool and that the invention is not limited by the type or configuration of the mold tool 110/112.

Figure 5A:
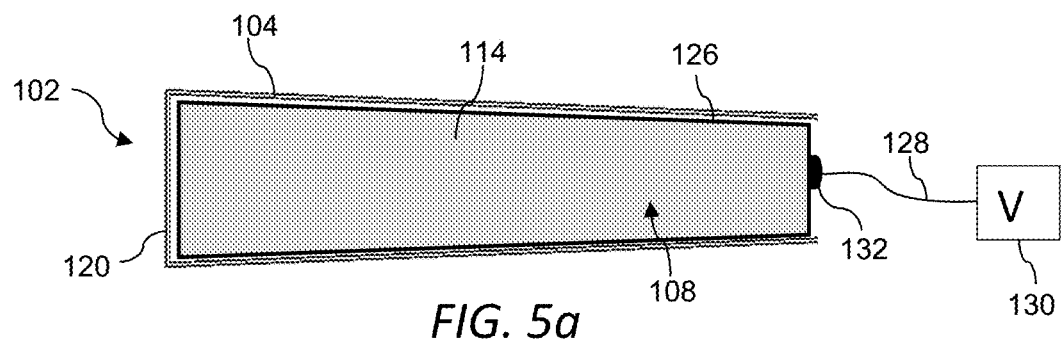
FIGS. 5a and 5b depict an embodiment with use of a compressible mandrel.
Figure 5B:
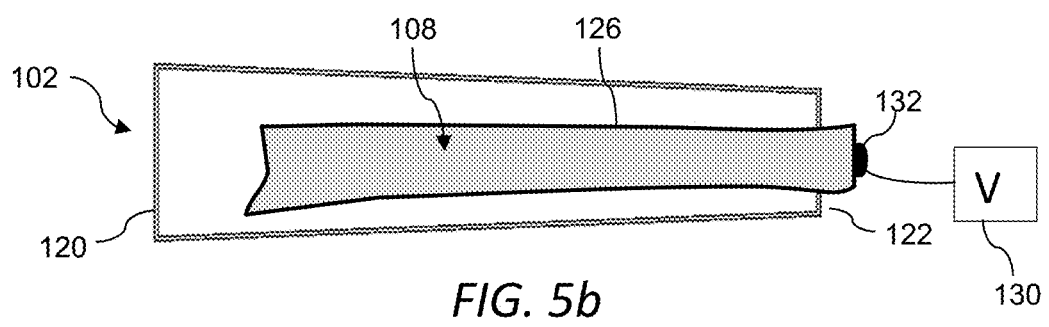

Also as discussed above, the invention is not limited by the type or configuration of the composite structure 102 formed by the method 100. In a particular embodiment, the composite structure 102 is a box-beam structure wherein, subsequent to curing of the resin, the mandrel 108 is withdrawn through an opening at an end of the box-beam structure. Referring to FIGS. 5*a* and 5*b*, the composite structure 102 may be a tapered box-beam spar structure 40 (FIGS. 2 and 3) for a for a wind turbine rotor blade 28 having a closed beam end 120 and a narrower open beam end 122. In this embodiment, the mandrel 108 may be formed of a compressible material, such as a foam material, wherein the method 100 includes drawing a vacuum on the mandrel 108 to compress the mandrel prior to withdrawing the mandrel 108 through the narrow opening 122 in the box-beam structure. The vacuum may be drawn through the vent 134 in the air tight layer that surrounds the mandrel 108, or through a different vacuum port 132, using a vacuum source 130, which results in the compression and shrinkage of the mandrel 108. The airtight layer 126 may be, for example, an elastic material sprayed or otherwise applied over the foam material, or an elastic bag, wrapping, or sleeve into which the foam material is slid.

The type of compressible material used to form all or part of the mandrel 108 can vary. In particular embodiments, the compressible material may be any suitable solid polymeric foam material having a neutral state with sufficient rigidity to maintain its defined shape during the fiber material lay up and curing process. In a particular embodiment, the solid foam material may be an open-cell foam material, particularly from a cost consideration. The solid foam material may be a closed-cell foam material, which are generally more rigid than open-cell foams, but are significantly more expensive. In addition, if a closed-cell foam is utilized, it must be sufficiently compressible via application of a vacuum in order to remove the mandrel 108 from the structural component 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for producing a hollow composite structure, comprising:
    placing a membrane within a mold tool, the membrane being permeable to air and impermeable to resin;
    placing a mandrel within the mold tool, the mandrel enclosed in an air tight layer that includes a vent;
    placing fiber reinforcement material around the mandrel within the mold tool;
    sealing the membrane at least partly around the fiber reinforcement material and mandrel;
    closing the mold tool, the vent line from the mandrel extending through the sealed membrane to outside of the mold tool;
    drawing a vacuum in the mold tool while the mandrel is vented to outside of the mold tool; and
    while the vacuum is being drawn, infusing resin into the mold tool around the mandrel such that the resin is drawn towards the membrane.

2. The method as in claim 1, wherein the resin is infused into the mold tool at one or more locations between the membrane and the mandrel.

3. The method as in claim 2, wherein the vacuum is drawn in the mold tool through one or more ports at a side of the membrane opposite to the resin infusion such that the resin is drawn by the vacuum through the fiber reinforcement material surrounding the mandrel to the membrane.

4. The method as in claim 1, further comprising placing a peel layer between the fiber reinforcement material and the membrane.

5. The method as in claim 1, further comprising placing a breather layer between the membrane and the mold tool.

6. The method as in claim 1, wherein the membrane completely encloses the fiber reinforcement material and the mandrel.

7. The method as in claim 1, further comprising predicting a resin flow pattern within the mold tool and identifying one or more voids where the resin is last-to-fill within the mold tool, the membrane being placed within the mold at locations corresponding to the last-to-fill voids without completely enclosing the fiber reinforcement material and the mandrel within the membrane.

8. The method as in claim 1, further comprising predicting a resin flow pattern within the mold tool and identifying one or more voids where the resin is last-to-fill within the mold tool, the vacuum being drawn through one or more ports in the mold tool at locations corresponding to the last-to-fill voids.

9. The method as in claim 1, wherein the mold tool is one of a female tool or a male tool.

10. The method as in claim 1, wherein the composite structure is a box-beam structure, subsequent to curing of the resin, the method comprising withdrawing the mandrel through an opening at an end of the box-beam structure.

11. The method as in claim 10, wherein the mandrel is formed of a compressible material, the method comprising drawing a vacuum on the mandrel to compress the mandrel prior to withdrawing the mandrel through the opening in the box-beam structure.

12. The method as in claim 11, wherein the vacuum is drawn through the vent in the air tight layer that surrounds the mandrel.

13. The method as in claim 11, wherein the box-beam structure is tapered with a larger closed end and a smaller open end through which the compressed mandrel is withdrawn.

14. The method as in claim 13, wherein the box-beam structure is a spar structure for a wind turbine rotor blade.

15. The method as in claim 1, further comprising placing a plurality of the mandrels enclosed in an air tight layer with a vent in the mold, wherein each of the mandrels defines a hollow space in the composite structure.

\* \* \* \* \*